(12) United States Patent
Durant et al.

(10) Patent No.: US 8,864,106 B2
(45) Date of Patent: Oct. 21, 2014

(54) VALVE SEAT APPARATUS HAVING POSITIVE RETENTION FOR USE WITH FLUID CONTROL DEVICES

(75) Inventors: Tony Alan Durant, Mckinney, TX (US); Samuel Harold Larsen, Murphy, TX (US); Kenneth Roger Schimnowski, Dension, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 852 days.

(21) Appl. No.: 12/327,161

(22) Filed: Dec. 3, 2008

(65) Prior Publication Data

US 2010/0133460 A1 Jun. 3, 2010

(51) Int. Cl.
*F16K 1/42* (2006.01)
*G05D 16/06* (2006.01)

(52) U.S. Cl.
CPC ............................ *G05D 16/0666* (2013.01)
USPC .......... 251/332; 251/333; 251/359; 251/360; 251/362; 137/505.42; 137/505.37

(58) Field of Classification Search
USPC ................ 251/332, 333, 359, 363, 360, 362; 137/505.42, 505.37
See application file for complete search history.

(56) References Cited

U.S. PATENT DOCUMENTS

| 235,747 | A | * | 12/1880 | Corliss | 251/360 |
| 610,744 | A | * | 9/1898 | Henion | 251/365 |
| 1,966,264 | A | * | 7/1934 | Roye | 251/332 |
| 2,060,748 | A | * | 11/1936 | Roberts et al. | 251/332 |
| 2,220,229 | A | * | 11/1940 | Grove | 137/505.37 |
| 2,301,031 | A | * | 11/1942 | Ferguson | 92/43 |
| 2,621,011 | A | * | 12/1952 | Smith | 251/121 |
| 2,835,269 | A | * | 5/1958 | Seymour | 137/467 |
| 2,969,951 | A | * | 1/1961 | Walton | 251/332 |
| 2,979,067 | A | * | 4/1961 | Kern, Jr. et al. | 137/15.19 |

(Continued)

FOREIGN PATENT DOCUMENTS

| GB | 2114269 | 8/1983 |
| JP | H07-500298 | 1/1995 |
| JP | 09-150728 | 10/1997 |
| JP | H10-326978 | 12/1998 |
| JP | 2002-267062 | 9/2002 |
| WO | 9322170 | 11/1993 |

OTHER PUBLICATIONS

International Searching Authority, "International Search Report," issued in connection with corresponding international application serial No. PCT/US2009/064043, mailed Feb. 9, 2010, 4 pages.

(Continued)

*Primary Examiner* — Elizabeth Houston
*Assistant Examiner* — Minh Le
(74) *Attorney, Agent, or Firm* — Hanley, Flight & Zimmerman, LLC.

(57) ABSTRACT

Valve seat apparatus having positive retention for use with fluid control devices are described herein. An example valve seat apparatus includes a metallic ring and an elastomeric ring coupled to the metallic ring and having a sealing surface to sealingly engage a flow control member of the fluid control device. At least a portion of an outer surface of the elastomeric ring includes an annular lip to sealingly engage an annular recess of a body of the fluid control device.

24 Claims, 3 Drawing Sheets

(56) References Cited

U.S. PATENT DOCUMENTS

| | | | |
|---|---|---|---|
| 2,982,515 A * | 5/1961 | Rule | 251/332 |
| 3,134,572 A * | 5/1964 | Glasgow | 251/363 |
| 3,327,991 A * | 6/1967 | Wallace | 251/172 |
| 3,362,680 A * | 1/1968 | Weiss | 251/360 |
| 3,809,362 A * | 5/1974 | Baumann | 251/332 |
| 4,219,042 A | 8/1980 | St. Laurent, Jr. | |
| 4,228,987 A * | 10/1980 | Potter | 251/210 |
| 4,445,532 A * | 5/1984 | Mitchell | 137/495 |
| 4,450,858 A | 5/1984 | Acomb | |
| 4,506,690 A * | 3/1985 | Mitchell | 137/1 |
| 4,515,347 A * | 5/1985 | Sitton et al. | 251/328 |
| 4,531,710 A * | 7/1985 | Tort O. | 251/167 |
| 4,676,482 A * | 6/1987 | Reece et al. | 251/365 |
| 5,020,490 A * | 6/1991 | Seko | 123/188.8 |
| 5,188,150 A * | 2/1993 | Esplin | 137/630.14 |
| 5,241,158 A * | 8/1993 | Schreder | 219/456.1 |
| 5,473,896 A | 12/1995 | Bergelin et al. | |
| 6,079,434 A | 6/2000 | Reid et al. | |
| 6,666,433 B1 * | 12/2003 | Pierce | 251/359 |
| 6,698,720 B2 * | 3/2004 | Bouloy et al. | 251/357 |
| 6,997,440 B2 * | 2/2006 | Tutt et al. | 251/331 |
| 7,909,057 B1 * | 3/2011 | Vicars | 137/516.29 |
| 2003/0089402 A1 * | 5/2003 | Gregoire | 137/505.42 |
| 2004/0108485 A1 * | 6/2004 | Lin et al. | 251/331 |
| 2010/0090418 A1 * | 4/2010 | Grupido et al. | 277/637 |

OTHER PUBLICATIONS

International Searching Authority, "Written Opinion of the International Searching Authority," issued in connection with corresponding international application serial No. PCT/US2009/064043, mailed Feb. 9, 2010, 7 pages.

The Federal Institute of Industrial Property, "Inquiry Under Substantive Examination," issued in connection with Russian Patent Application No. 2011124300/28(035859), Nov. 11, 2013, 6 pages.

Japanese Patent Office, "Notice of Reason for Rejection," issued in connection with Japanese Patent Application No. 2011-539553, mailed Nov. 19, 2013, 4 pages.

Marsh Bellofram, "Type 70 and 70BP Pressure Regulator Series," pp. 25-27.

Emerson Process Management, "Instruction Manual for 64 Series Pressure Reducing Regulators," published Mar. 2006, pp. 1-8.

Emerson Process Management, "Instruction Manual for 67C Series Instrument Supply Regulators," published May 2006, pp. 1-12.

Fairchild Industrial Products Company, "Installation, Operation and Maintenance Instructions for Fairchild Model 10 Pneumatic Precision Regulator," Rev. R., published Oct. 2003, 4 pages.

Japanese Patent Office, "Notice of Reason for Rejection," issued in connection with Japanese Patent Application No. 2011-539553, with English translation, mailed Jun. 17, 2014, 4 pages.

* cited by examiner

VALVE SEAT APPARATUS HAVING POSITIVE RETENTION FOR USE WITH FLUID CONTROL DEVICES

FIELD OF THE DISCLOSURE

The present disclosure relates generally to fluid control devices and, more particularly, to valve seat apparatus having positive retention for use with fluid control devices.

BACKGROUND

Fluid control devices, such as fluid regulators and control valves, are commonly distributed throughout process control systems to control fluid flow rates and/or pressures of various fluids (e.g., liquids, gasses, etc.). For example, fluid regulators are typically used to regulate the pressure of a fluid to a lower and/or substantially constant value. Specifically, a fluid regulator has an inlet that typically receives a supply fluid at a relatively high pressure and provides a relatively lower and/or substantially constant pressure at an outlet. As the high pressure process fluid travels through the process control system, the regulator reduces the pressure of the process fluid at one or more points to supply a process fluid having a lower or reduced pressure to a sub-system or other custody transfer points. For example, a regulator associated with a piece of equipment (e.g., a boiler) may receive a fluid (e.g., gas) having a relatively high and somewhat variable pressure from a fluid distribution source and may regulate the fluid to have a lower, substantially constant pressure suitable for safe, efficient use by the equipment.

A regulator typically reduces inlet pressure to a lower outlet pressure by restricting fluid flow through an orifice to match the fluctuating downstream demand. To restrict fluid flow between an inlet and an outlet, a regulator typically employs a valve plug to engage a valve seat disposed within the orifice of the regulator body. Some known fluid regulators use a valve seat made from an elastomeric material to provide a tight seal between the valve seat and a valve plug. In such known regulators, the valve seat is typically disposed within the orifice so that the frictional forces between the elastomeric valve seat and the body of the regulator maintain the valve seat within the body of the regulator. However, this known frictional coupling of the valve seat to the body of the regulator may allow the valve seat to shift or move relative the body due to, for example, reverse pressure (i.e., back pressure) conditions, degradation of the elastomeric material, sticking between the valve plug and the valve seat (e.g., due to rubber bloom) when the valve plug moves away from the valve seat, etc. Such shifting or movement of the valve seat relative to the body can cause misalignment between the valve seat and the valve plug, thereby causing unwanted leakage of fluid past the valve seat and affecting the performance of the fluid regulator.

SUMMARY

In one example, a valve seat apparatus having a positive retention for use with a fluid control device includes a metallic ring and an elastomeric ring coupled to the metallic ring and having a sealing surface to sealingly engage a flow control member of the fluid control device. At least a portion of an outer surface of the elastomeric ring includes an annular lip to sealingly engage an annular recess of a body of the fluid control device.

In another example, a valve seat apparatus having a positive retention for use with a fluid regulator includes a substantially rigid support member coupled to a substantially resilient sealing member. An inner surface of the sealing member is coupled to the outer surface of the support member and at least a portion of an outer surface of the sealing member has a first outer diameter and a second outer diameter larger than the first outer diameter to form at least one protruding member to retain the valve seat apparatus in a body of the fluid regulator.

In yet another example, a fluid regulator includes a body having a shoulder formed by an annular cavity in the body between an inlet and an outlet and a valve seat disposed within the body. The valve seat includes a first ring-shaped member and a second ring-shaped member coupled to the first ring-shaped member to provide a sealing surface to sealingly engage a movable valve plug of the regulator. The second ring-shaped member has an outer lip portion frictionally engaged in the annular cavity so that the lip portion engages the shoulder of the body to retain the valve seat in the body.

DETAILED DESCRIPTION

Figure 1:
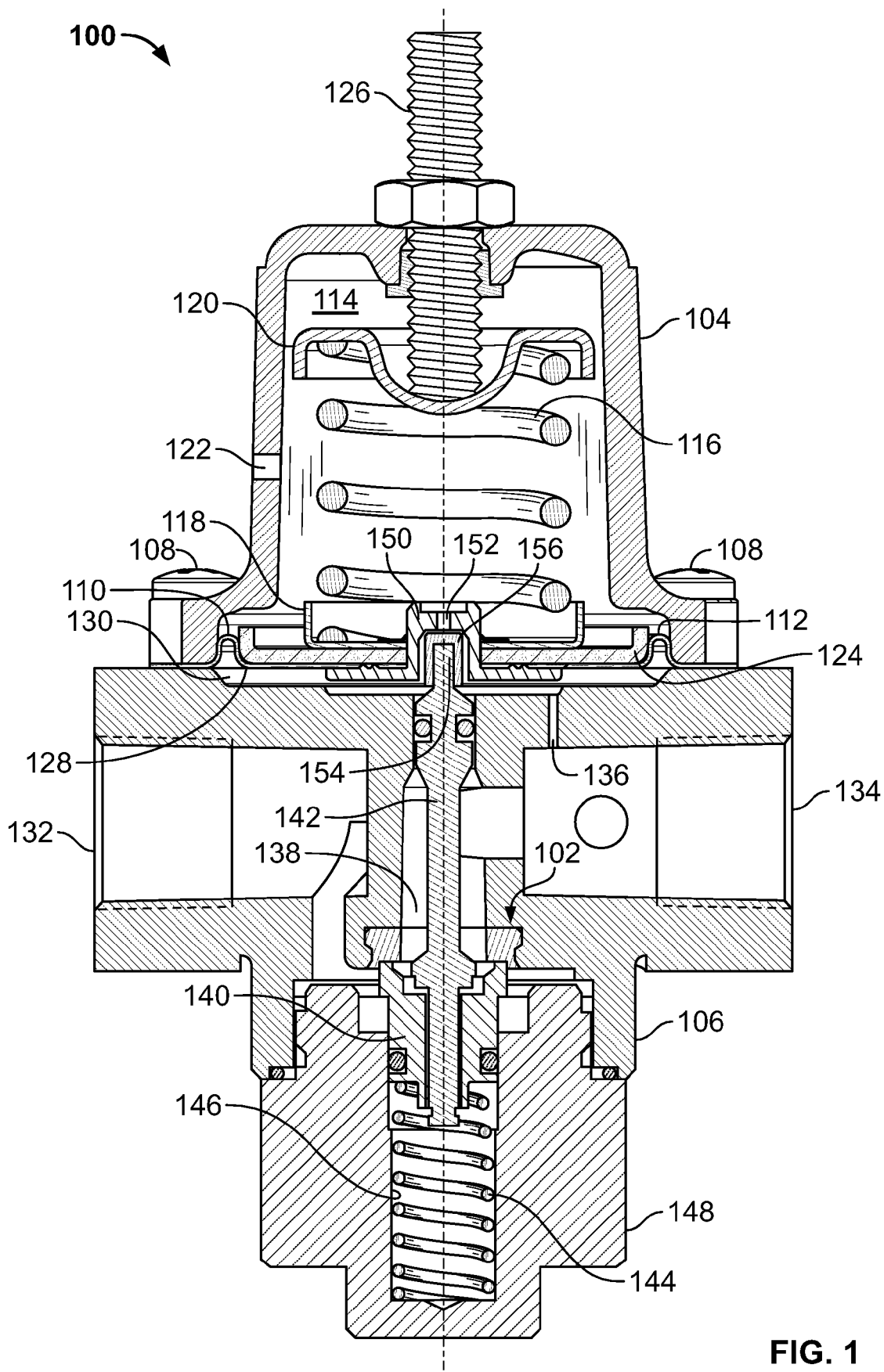
FIG. 1 illustrates a cross-sectional view of a fluid regulator implemented with an example valve seat apparatus described herein.

In general, fluid regulators modulate the flow of fluid in accordance with a sensed downstream pressure to maintain process system pressures within acceptable and/or constant pressure limits. Fluid regulators typically regulate the flow and pressure of process fluid in response to a difference between an outlet fluid pressure (i.e., a force applied to one side of a diaphragm) and a pre-set control force (i.e., a force applied to another side of the diaphragm) to vary the flow through the regulator to achieve a substantially constant outlet pressure.

Fluid regulators typically include a diaphragm operatively coupled to a valve plug via a diaphragm plate and a valve stem. The diaphragm moves in a rectilinear path in response to a difference in force between a force exerted by the pressure of the fluid at the outlet and a pre-set force (e.g., set via a spring). Movement of the diaphragm causes the valve plug to move away from or toward a valve seat to allow or restrict the flow of fluid between the inlet and the outlet of the regulator. In some known regulators, the valve seat is made of an elastomeric material and is frictionally coupled to the body of the regulator. In particular, frictional forces between the elastomeric material of the valve seat and an inner surface the regulator body hold the valve seat in position relative to the regulator body. However, this known configuration may allow the valve seat to shift or move relative to the body due to, for example, reverse pressure conditions (i.e., back pressure conditions) that occur when the outlet pressure is substantially greater than the inlet pressure (e.g., when the valve plug is away from the valve seat). Such back pressure conditions may be due to, for example, temperature fluctuations of the fluid. Additionally or alternatively, degradation of the elastomeric material of the valve seat may allow the valve seat to shift or move relative to the valve body. Additionally or alternatively, when the valve plug engages the valve seat for an extended period of time, the elastomeric valve seat may stick or attach to an edge of a valve plug due to, for example, compounds in the elastomeric material leaching out and attaching to the valve plug (e.g., rubber bloom), thereby causing the valve seat to move or shift relative to the body of the regulator when the valve plug moves away from the valve seat. Such shifting or movement of the valve seat relative to the body can cause misalignment between the valve seat and the valve plug, thereby causing unwanted leakage past the valve seat and affecting the performance of the fluid regulator.

The example valve seat apparatus described herein provide a positive retention to substantially prevent movement of the valve seat apparatus relative to a body of a fluid control device such as, for example, a fluid regulator. In one example described herein, a valve seat apparatus is coupled (e.g., frictionally coupled, fixedly coupled, etc.) to a regulator body to prevent inadvertent back out of the valve seat apparatus during valve operation. In particular, an example valve seat apparatus described herein includes an elastomeric ring that frictionally engages or fits within an orifice of a regulator body (or other fluid control device body) to frictionally couple the valve seat apparatus to the regulator body. The elastomeric ring is coupled to a metallic ring, which provides rigid support to the resilient elastomeric ring. Additionally, unlike known valve seats, the example elastomeric ring includes an annular lip that frictionally engages (e.g., is disposed within) an annular cavity or groove of the regulator body adjacent the orifice of the regulator body. Also, the annular lip forms a shoulder that engages a shoulder of the body formed by the annular cavity or groove. In this manner, the engagement of the lip with the cavity and the shoulder of the body provides a positive retention and substantially prevents movement of the valve seat apparatus relative to the regulator body. Such positive retention is particularly advantageous in applications that experience reverse back pressures between the inlet and the outlet (i.e., outlet pressures that exceed inlet pressures), sticking between the valve plug and the valve seat (e.g., due to rubber bloom) when the valve plug moves away from the valve seat after the valve plug engages the valve seat for an extended period of time, etc., by preventing movement of the valve seat apparatus relative to the body.

FIG. 1 illustrates a cross-sectional view of an example fluid regulator 100 implemented with an example valve seat apparatus 102 described herein. In this example, the fluid regulator 100 includes an upper body 104 and a lower body 106 that are coupled together via a plurality of fasteners 108. A diaphragm 110 is captured between the upper body 104 and the lower body 106. The upper body 104 and a first side 112 of the diaphragm 110 define a first chamber 114. A spring 116 is disposed within the upper body 104 between a first spring seat 118 and an adjustable second spring seat 120. In this example, the first chamber 114 is fluidly coupled to, for example, the atmosphere, via an aperture 122.

The first spring seat 118 is coupled to a diaphragm plate 124 that supports the diaphragm 110. A spring adjuster 126 (e.g., a screw) engages the second spring seat 120 to enable adjustment of the length of the spring 116 (e.g., compress or decompress the spring 116) and, thus, adjustment (e.g., to increase or decrease) of the amount of a pre-set force or load that the spring 116 exerts on the first side 112 of the diaphragm 110.

The lower body 106 and a second side 128 of the diaphragm 110 at least partially define a second chamber 130, an inlet 132, and an outlet 134. The second chamber 130 is fluidly coupled to the outlet 134 via a channel 136. The valve seat apparatus 102 is disposed within the lower body 106 and defines an orifice 138 between the inlet 132 and the outlet 134. A valve plug 140 is operatively coupled to the diaphragm 110 via a valve stem 142 and the diaphragm plate 124. A second spring 144 is disposed within a cavity 146 of a valve plug retainer 148 to bias the valve plug 140 toward the valve seat apparatus 102. In the illustrated example, the valve plug 140 engages the valve seat apparatus 102 to provide a tight seal to prevent fluid flow between the inlet 132 and the outlet 134. The spring rate of the second spring 144 is typically substantially smaller relative to the spring rate of the spring 116.

In this example, the fluid regulator 100 includes an internal relief valve 150 coupled to the diaphragm 110 via the diaphragm plate 124. The relief valve 150 includes an aperture 152 that fluidly couples the first chamber 114 and the second chamber 130. A second end 154 of the valve stem 142 includes a soft or compliant seat 156 that engages the aperture 152 of the relief valve 150 to prevent (e.g., block) the flow of fluid between the first and second chambers 114 and 130, respectively. However, in other examples, the fluid regulator 100 may include a coupling seat (i.e., a non-venting seat) instead of the internal relief valve 150 to operatively couple the diaphragm 110 and the valve plug 140. In yet other examples, the valve stem 142 may be fixedly coupled to the diaphragm plate 124 (e.g., via fasteners).

In operation, the inlet 132 is in fluid communication with, for example, an upstream fluid distribution source that provides fluid having a relatively high pressure. The outlet 134 is in fluid communication with a downstream demand source, pressure regulator, or any other custody point that demands process fluid at a desired (e.g., a lower) pressure.

The fluid regulator 100 typically regulates the upstream pressure of the fluid at the inlet 132 to provide or develop a desired pressure at the outlet 134. To achieve a desired outlet pressure, the spring 116 exerts a force on the first side 112 of the diaphragm 110 which, in turn, positions the valve plug 140 relative to the valve seat apparatus 102 to restrict the flow of the process fluid between the inlet 132 and the outlet 134. Thus, the outlet or desired pressure is dependent upon the amount of pre-set force exerted by the spring 116 to position the diaphragm 110 and, thus, the valve plug 140 relative to the valve seat apparatus 102. The desired pressure set point may be configured by adjusting the force exerted by the spring 116 on the first side 112 of the diaphragm 110 via the spring adjuster 126.

When the downstream demand increases, the pressure of the fluid at the outlet 134 decreases. The second chamber 130 senses the decreasing pressure of the process fluid at the outlet 134 via the channel 136. When the force exerted on the second side 128 of the diaphragm 110 by the pressure of the fluid in the second chamber 130 decreases below the pre-set force exerted by the spring 116 on the first side 112 of the diaphragm 110, the spring 116 causes the diaphragm 110 to move toward the second chamber 130. When the diaphragm 110 moves toward the second chamber 130, the valve plug 140 moves away from the valve seat apparatus 102 to allow fluid to flow through the orifice 138 between the inlet 132 and the outlet 134 (e.g., an open position), thereby causing the pressure at the outlet 134 to increase.

Conversely, as the outlet or downstream demand decreases or is shut-off, the pressure of the process fluid at the outlet 134 increases. As noted above, the increasing fluid pressure at the outlet 134 is registered in the second chamber 130 via the channel 136 and exerts a force on the second side 128 of the diaphragm 110. When the pressure of the fluid in the second chamber 130 exerts a force on the second side 128 of the diaphragm 110 that equals or exceeds the pre-set force exerted by the spring 116 on the first side 112 of the diaphragm 110, the diaphragm 110 moves toward the first chamber 114 (e.g., an upward direction against the force exerted by the spring 116 in the orientation of FIG. 1). When the diaphragm 110 moves toward the first chamber 114, the diaphragm 110 causes the valve plug 140 to move toward the valve seat apparatus 102 to restrict the flow of fluid through the orifice 138. The second spring 144 biases the valve plug 140 toward the valve seat apparatus 102 to sealingly engage the valve seat apparatus 102 (e.g., in a closed position) to substantially prevent fluid flow through the orifice 138 between the inlet 132 and the outlet 134 and, thus, reduce supply of the pressure to the downstream source (i.e., a lock-up condition). A lock-up condition of the fluid regulator 100 occurs when the valve plug 140 sealingly engages the valve seat apparatus 102 to provide a tight seal and prevent fluid flow between the inlet 132 and the outlet 134.

During normal operation (e.g., prior to lock-up), the soft seat 156 engages the aperture 152 of the relief valve 150 to prevent unwanted leakage of fluid between the first and second chambers 114 and 130. At the onset of the lock-up condition, the valve plug 140 engages the valve seat apparatus 102 to prevent the flow of fluid between the inlet 132 and the outlet 134.

However, in some instances, the pressure of the fluid at the outlet 134 increases when the downstream demand decreases (e.g., the downstream source is shut-off) and the valve plug 140 fails to sealingly engage the valve seat apparatus 102 (i.e., the regulator 100 fails to lock-up) due to, for example, grit, pipe scale, etc. The increase in pressure of the fluid at the outlet 134 exerts a force on the second side 128 of the diaphragm 110 that causes the diaphragm 110 and the diaphragm plate 124 to move toward the first chamber 114 (i.e., to compress the spring 116 in an upward direction in the orientation of FIG. 1). As a result, the relief valve 150, which is coupled to the diaphragm 110 via the diaphragm plate 124, moves away from the soft seat 156. Movement of the diaphragm 110 toward the first chamber 114 causes the internal relief valve 150 to move away from the soft seat 156 to fluidly couple the second chamber 130 and the first chamber 114 to bleed or vent the pressure to, for example, the atmosphere via the aperture 122.

The example valve seat apparatus 102 described herein advantageously prevents the valve seat apparatus 102 from inadvertently backing out of the lower body 106 (i.e., moving away from the body 106) due to back pressure conditions. Unlike some known valve seats, for example, an outlet pressure that is greater than the inlet pressure does not cause the valve seat apparatus 102 to shift or move relative to the lower body 106 (e.g., the orifice 138). Additionally or alternatively, the example seat apparatus 102 described herein advantageously prevents the valve seat apparatus 102 from inadvertently shifting or moving relative to the lower body 106 due to, for example, the valve plug 140 sticking or attaching to the valve seat apparatus 102 (e.g., due to rubber bloom) when the valve plug 140 moves away from the valve seat apparatus 102 after the valve plug 140 engages the valve seat apparatus 102 for an extended period of time. As noted above, preventing such movement prevents misalignment between the valve plug 140 and the valve seat apparatus 102, thereby improving regulator performance.

Figure 2A:
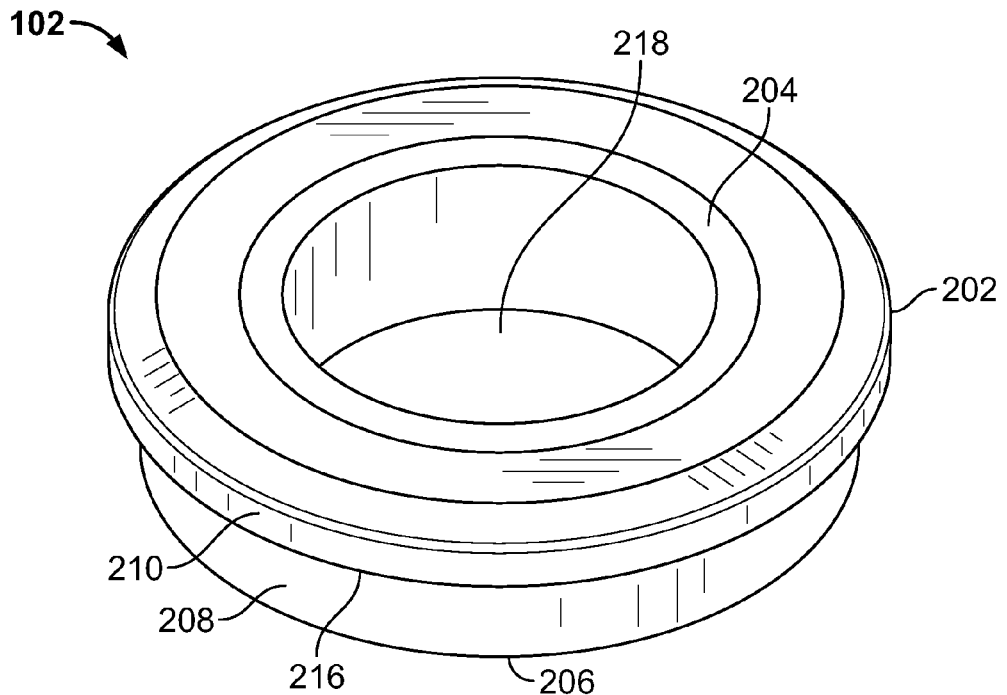
FIG. 2A is a more detailed view of the example valve seat apparatus illustrated in FIG. 1.
Figure 2B:
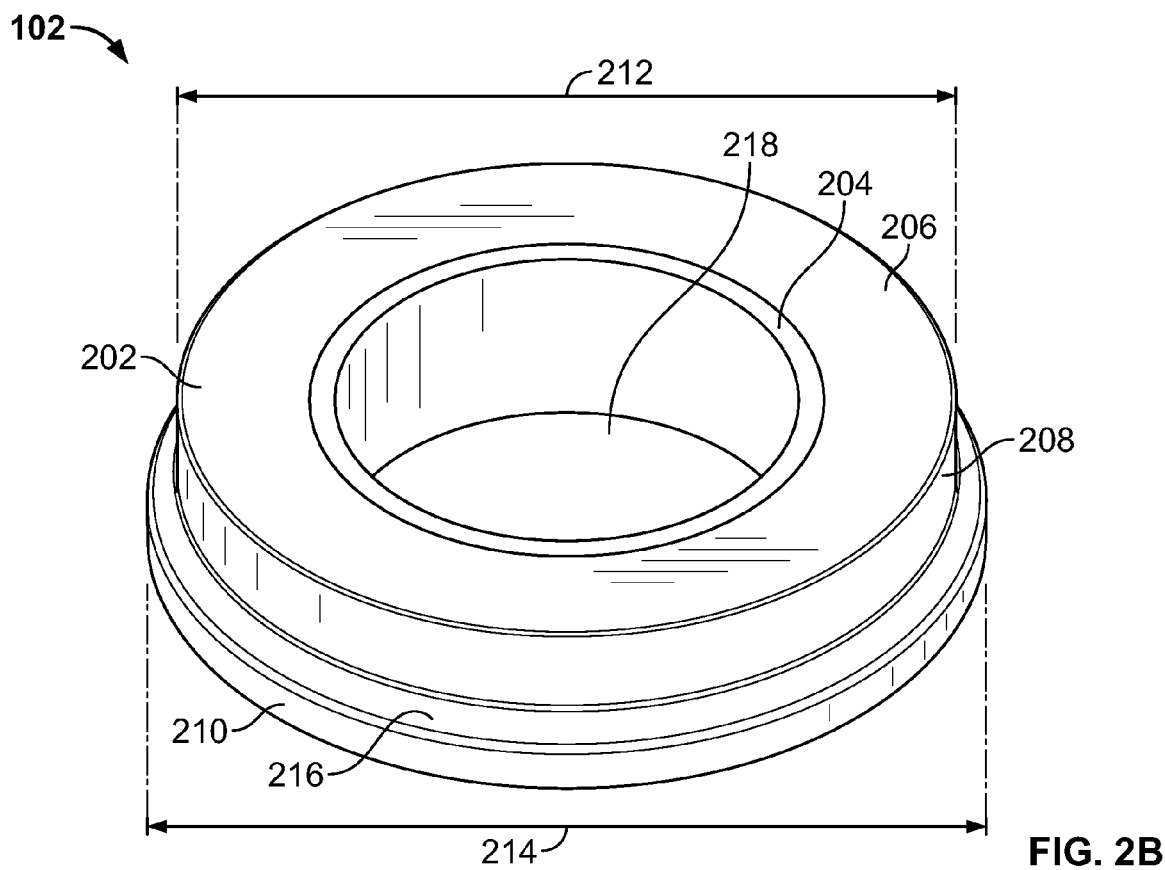
FIG. 2B is another detailed view of the example valve seat apparatus illustrated in FIG. 2A.

FIG. 2A is a more detailed view of the example valve seat apparatus 102 illustrated in FIG. 1. FIG. 2B is another detailed view of the example valve seat apparatus 102 illustrated in FIG. 2A. Referring to FIGS. 2A and 2B, the example valve seat apparatus 102 includes a sealing member 202 coupled to a rigid support member 204. In this example, the sealing member 202 is a substantially resilient elastomeric ring-shaped member or ring and the rigid support member 204 is a substantially rigid metallic ring-shaped member or ring. The elastomeric ring 202 is coupled to the metallic ring 204 and provides sealing surfaces 206 and 208.

In this example, at least a portion of the elastomeric ring 202 includes at least one protruding member or annular lip 210. The elastomeric ring 202 has a first outer diameter 212 and a second outer diameter 214 that is larger than the first outer diameter 212 to form the lip 210. The lip 210 also forms a shoulder 216 between the diameters 212 and 214. Although not shown, in other examples, the elastomeric ring 202 may include a plurality of annular lips. The elastomeric ring 202 may be made of, for example, rubber, nitrile, fluoroelastomer (FKM), Neoprene, or any other suitable elastomeric and/or resilient materials.

The elastomeric ring 202 surrounds the metallic ring 204 so that the metallic ring 204 supports the elastomeric ring 202. The metallic ring 204 has an aperture 218 that provides a fluid flow passageway when the valve seat apparatus 102 is disposed within the lower body 106 of the fluid regulator 100. In this example, the metallic ring 204 is made of stainless steel and manufactured via machining. However, in other examples, the ring 204 may be made of brass, carbon steel, plastic, or any other suitable rigid material(s). In yet other examples, the metallic ring 204 may be manufactured via molding and/or any other suitable manufacturing process(es).

In this example, the elastomeric ring 202 is coupled to the metallic ring 204 via molding (e.g., over molding). The elastomeric ring 202 is molded over the metallic ring 204 to form the valve seat apparatus 102. In other examples, the elastomeric ring 202 may be assembled or press fit to the metallic ring 204 to form the valve seat apparatus 102. To facilitate coupling the elastomeric ring 202 to the metallic ring 204 via, for example, molding, the metallic ring 204 includes an annular protruding edge 302 (FIG. 3B) protruding from an outer surface 304 (FIG. 3B) of the metallic ring 204. The protruding edge 302 may be formed via, for example, machining. In this example, the protruding edge 302 has a rectangular cross-sectional shape. However, in other examples, the protruding edge 302 may have a T-shape cross-sectional shape, an arcuate cross-sectional shape, or any other suitable cross-sectional shape. Likewise, an inner surface 306 (FIG. 3B) of the elastomeric ring 202 has (e.g., forms) an annular groove 308 to receive the protruding edge 302 when the elastomeric ring 202 is coupled (e.g., over molded) to the metallic ring 204. In other examples, the elastomeric ring 202 may be coupled or bonded to the metallic ring 204 via chemical fasteners (e.g., adhesives) or any other suitable fastening mechanism(s). In this example, a portion 307 of the outer surface 304 of the metallic ring 204 is tapered. In other examples, the outer surface 304 of the metallic ring 204 may include any other suitable shape.

Figure 3A:
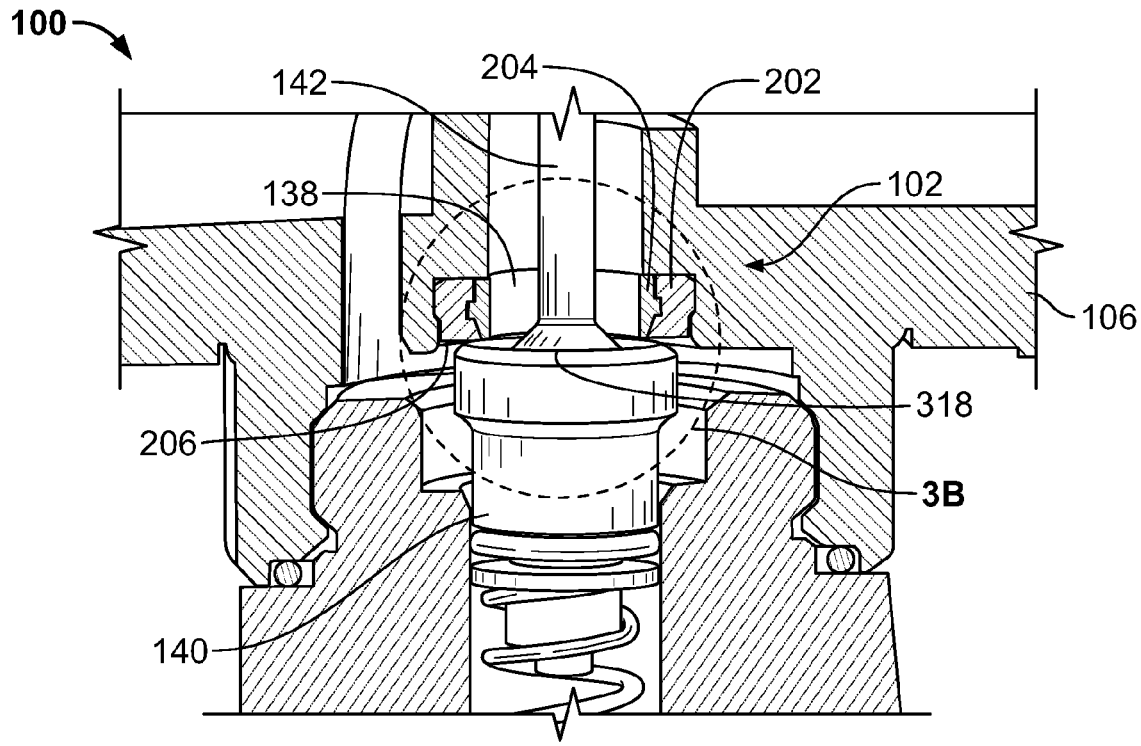
FIG. 3A is an enlarged partial cutaway view of the example valve seat apparatus and the fluid regulator of FIGS. 1, 2A, and 2B.
Figure 3B:
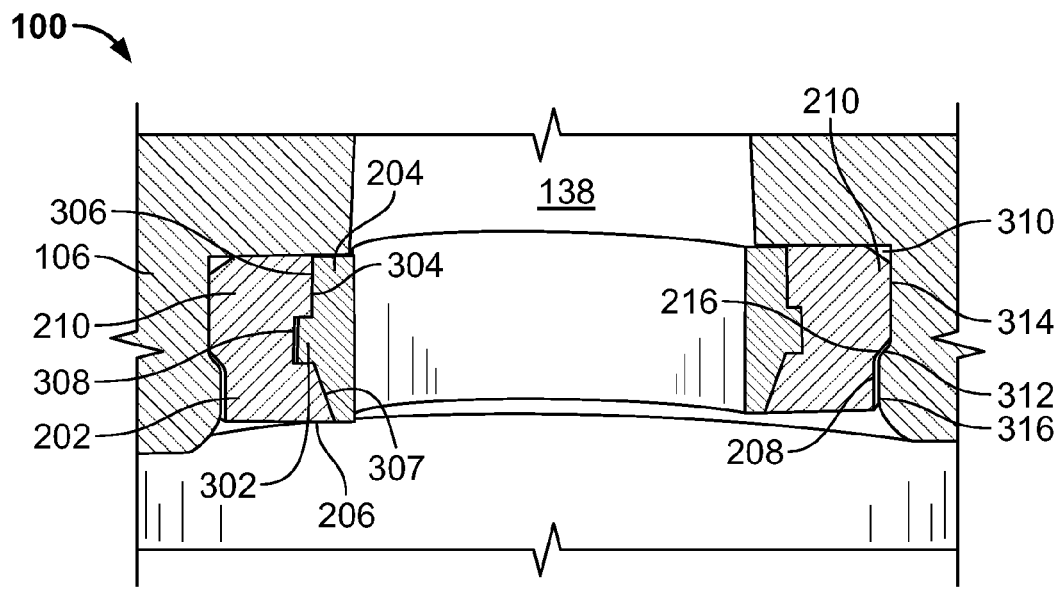
FIG. 3B is an enlarged partial cutaway view of the example valve seat apparatus and fluid regulator of FIGS. 1, 2A, 2B, and 3A.

FIG. 3A illustrates an enlarged partial cutaway view of the example valve seat apparatus 102 and the fluid regulator 100 of FIGS. 1, 2A, and 2B. FIG. 3B illustrates an enlarged partial cutaway view of the example valve seat apparatus 102 and fluid regulator 100 shown in FIGS. 1, 2A, 2B, and 3A. Referring to FIGS. 3A and 3B, the valve seat apparatus 102 is disposed within (e.g., inserted into) the lower body 106 of the fluid regulator 100 to encompass a flow path between the inlet 132 and the outlet 134. More specifically, the valve seat apparatus 102 is frictionally fit or coupled to the orifice 138 of the lower body 106. The lower body 106 includes an undercut or cavity 310 that forms a shoulder 312. The valve seat apparatus 102 is press fit within the orifice 138 (e.g., via a tool) so that the lip 210 engages (e.g., is inserted into) the cavity 310 of the lower body 106. In this manner, the lip 210 is disposed within the cavity 310 so that the shoulder 216 of the elastomeric ring 202 engages the shoulder 312 of the lower body 106. As a result, the valve seat apparatus 102 provides a positive retention to prevent the valve seat apparatus 102 from moving or shifting relative to the lower body 106. The shoulder 312 may have a tapered edge, a substantially right-angled edge, a chamfered edge, or any other suitable edge.

Additionally, the frictional forces between the sealing surface 208 and the lip 210 of the elastomeric ring 202 and respective surfaces 314 and 316 of the lower body 106 frictionally couple the valve seat apparatus 102 to the lower body 106 when the valve seat apparatus 102 is disposed within the lower body 106. The metallic ring 204 provides support to the elastomeric ring 202 and exerts radial reactive forces in a direction toward the surfaces 314 and 316 of the lower body 106 to prevent the elastomeric ring 202 from radially collapsing (e.g., folding) toward the orifice 138 when disposed within the lower body 106. As most clearly shown in FIG. 3B, the lip 210 is compressed between the surface 314 and the outer surface 304 of the metallic ring 204 when disposed in the cavity 310 of the lower body 106. Similarly, the sealing surface 208 is compressed between the surface 316 of the lower body 106 and the outer surface 304 of the metallic ring 204.

In operation, the valve plug 140 sealingly engages the sealing surface 206 of the elastomeric ring 202 to prevent fluid flow between the inlet 132 and the outlet 134. In this example, the valve plug 140 has a knife-edge cross-sectional shape 318 that engages the sealing surface 206. However, in other examples, the valve plug 140 may have any other suitable cross-sectional shape. When the valve plug 140 moves away from the sealing surface 206, fluid flows between the inlet 132 and the outlet 134 through the aperture 218 of the metallic ring 204. If the valve seat apparatus 102 is exposed to high pressures and/or back pressure conditions, the lip 210 provides a positive retention and prevents the valve seat apparatus 102 from moving or shifting relative to the lower body 106, thereby improving regulator performance.

Additionally or alternatively, in operation, the lip 210 provides a positive retention to prevent the valve seat apparatus 102 from moving relative to the valve plug 140 if the valve plug 140 sticks or attaches to the sealing surface 206. For example, in operation, the valve plug 140 may engage the sealing surface 206 of the valve seat apparatus 102 for a substantial period of time (e.g., during a lock-up condition of the regulator 100). As a result, the knife-edge 318 of the valve plug 140 may stick or attach to the sealing surface 206 due to, for example, compounds of the elastomeric ring 202 leaching thereby causing the valve plug 140 to attach to the sealing surface 206 (e.g., due to rubber bloom). When the valve plug 140 moves away from the valve seat apparatus 102 to the open position, the lip 210 provides a positive retention and prevents the valve seat apparatus 102 from moving or shifting relative to the lower body 106.

The example valve seat apparatus 102 is not limited for use with the example fluid regulator 100 of FIGS. 1, 2A, 2B, 3A, and 3B. In other examples, the valve seat apparatus 102 may be implemented with other fluid regulators, control valves (e.g., linear valves, rotary valves, etc.), and/or any other suitable fluid control devices.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. A fluid control device, comprising:
a valve body comprising an aperture, the aperture having a shoulder defining a first groove of the valve body and a first angled surface between the shoulder and an end of the aperture; and
a valve seat comprising a positive retention for use with the fluid control device, the valve seat comprising:
a metallic ring comprising a first inner circumferential surface and a first outer circumferential surface, the first outer circumferential surface comprising a first protrusion and a second angled surface, the first and second angled surfaces being non-parallel and non-perpendicular relative to an axis extending through the valve seat; and
an elastomeric ring comprising a sealing surface, a second inner circumferential surface, and a second outer inner circumferential surface, the second inner circumferential surface comprising a second groove and a third angled surface, the second outer circumferential surface comprising a second protrusion and a fourth angled surface, the third and fourth angled surfaces being non-parallel and non-perpendicular relative to the axis extending through the valve seat, the sealing surface to be sealingly engaged by a flow control member of the fluid control device, the metallic ring being attached to the elastomeric ring prior to positioning the metallic ring and the elastomeric ring in the valve body of the fluid control device, the third angled surface of the elastomeric ring to matably engage the second angled surface of the metallic ring, the metallic ring disposed in an opening of the elastomeric ring and configured so that the metallic ring is not to engage the flow control member, the sealing surface to be positioned between the metallic ring and the valve body of the fluid control device prior to engagement of the flow control member with the sealing surface and during engagement of the flow control member with the sealing surface, the metallic ring to exert a radial force to the elastomeric ring to urge the first protrusion into the second groove, the second protrusion into the first groove, and the fourth angled surface to matably engage the first angled surface.

2. A fluid control device as defined in claim 1, wherein the elastomeric ring is frictionally coupled to the valve body of the fluid control device.

3. A fluid control device as defined in claim 1, wherein a surface of the metallic ring opposite the sealing surface of the elastomeric ring engages a surface of the valve body defined by the first groove.

4. A fluid control device as defined in claim 1, wherein the first groove of the elastomeric ring is disposed at approximately a midpoint of the first inner circumferential surface of the elastomeric ring between a first edge of the elastomeric ring and a second edge opposite the first edge.

5. A fluid control device as defined in claim 1, wherein the valve seat is retained within the valve body without the use of a cage.

6. A fluid control device as defined in claim 1, wherein upper and lower edges of the metallic ring are substantially aligned with respective upper and lower edges of the elastomeric ring when the metallic ring is coupled to the elastomeric ring.

7. A fluid control device as defined in claim 1, wherein a first edge of the metallic ring is substantially flush relative to a first edge of the sealing surface of the elastomeric ring.

8. A fluid control device as defined in claim 7, wherein a second edge of the metallic ring is substantially flush relative to a second edge of the elastomeric ring opposite the sealing surface.

9. A fluid control device as defined in claim 1, wherein the first protrusion is positioned between an upper edge and a lower edge of the metallic ring.

10. A fluid control device as defined in claim 1, wherein the end of the aperture comprises a curved surface.

11. A fluid control device as defined in claim 10, further comprising a chamfered portion adjacent the second outer circumferential surface and opposite the sealing surface, the chamfered portion to slidably engage the curved surface of the end to facilitate the second protrusion of the elastomeric ring being received by the first groove of the valve body.

12. A valve seat apparatus having a positive retention for use with a fluid regulator, comprising:
a substantially rigid support ring coupled to a substantially resilient sealing ring, the rigid support ring comprising a first inner surface and a first outer surface, the first outer surface comprising a first protrusion, the resilient sealing ring comprising a second inner surface, a second outer surface, and a sealing surface, the second inner surface comprising a first recess, the second outer surface comprising a second protrusion and a chamfered portion, the chamfered portion adjacent the second outer surface and opposite the sealing surface, the sealing surface to be engaged by a valve plug of the fluid regulator, the sealing surface being substantially flush with an edge of the rigid support ring when the rigid support ring and the resilient sealing ring are positioned in a valve body of the fluid regulator, the first recess to receive the first protrusion to couple the rigid support ring and the resilient sealing ring, the chamfered portion to slidably engage a curved portion adjacent an opening of the valve body to facilitate the second protrusion being received within a second recess of the valve body, when the valve seat apparatus is positioned within the valve body, the rigid support ring to exert an outward radial force to the resilient sealing ring to urge the first protrusion into the first recess and the second protrusion into the second recess, wherein the second outer surface comprises a first angled surface non-parallel and non-perpendicular relative to an axis extending through the valve seat apparatus when the valve seat apparatus is positioned in the valve body, the first angled surface to matably engage a second angled surface of the valve body when the rigid support ring and the resilient sealing ring are positioned in the valve body.

13. A valve seat apparatus as defined in claim 12, wherein the second protrusion is to be press fit into the second recess of the valve body of the fluid regulator.

14. A valve seat apparatus as defined in claim 12, wherein the resilient sealing ring substantially surrounds the rigid support ring.

15. A valve seat apparatus as defined in claim 12, wherein the rigid support ring comprises a metallic ring and the resilient sealing ring comprises an elastomeric ring.

16. A valve seat apparatus as defined in claim 12, wherein the first recess in the resilient sealing ring is disposed adjacent a midpoint of the resilient sealing ring between a first edge of the resilient sealing ring and a second edge of the resilient sealing ring opposite the first edge.

17. A valve seat apparatus as defined in claim 12, wherein a height of the rigid support ring along an axis extending through the valve seat apparatus is substantially equal to a height of the resilient sealing ring along the axis extending through the valve seat apparatus.

18. A valve seat apparatus as defined in claim 12, wherein the second protrusion forms a first lip to directly engage a second lip formed by the second recess of the valve body of the fluid regulator.

19. A valve seat apparatus as defined in claim 12, wherein the first outer surface comprises a third angled surface and the second inner surface comprises a fourth angled surface matably engaged to the third angled surface, the third and fourth angled surfaces being non-parallel and non-perpendicular relative to an axis extending through the valve seat apparatus.

20. A fluid regulator, comprising:
a valve body comprising an inlet, an outlet, an aperture positioned between the inlet and the outlet, and a curved portion adjacent an opening of the aperture, the aperture comprising a shoulder to define a first groove; and
a valve seat disposed within the aperture of the valve body, the valve seat comprising:
a first ring-shaped portion comprising a first inner surface and a first outer surface, the first outer surface comprising a first protrusion; and
a second ring-shaped portion that surrounds the first ring-shaped portion to be sealingly engaged by a movable valve plug, the second ring-shaped portion comprising a second inner surface, a second outer surface, a sealing surface, and a chamfered portion, the second outer surface comprising a second protrusion to engage the shoulder and to be received by the first groove to retain the valve seat relative to the valve body, the chamfered portion to slidably engage the curved portion adjacent the opening of the aperture to facilitate positioning the first and second ring-shaped portions within the valve body, the second inner surface comprising a second groove to receive the first protrusion of the first ring-shaped portion, the first ring-shaped portion being disposed in an opening of the second ring-shaped portion, the sealing surface to be sealingly engaged by the movable valve plug when the valve seat is retained relative to the valve body, the first ring-shaped portion to exert a radial outward force to the second ring-shaped portion to urge the first protrusion into the second groove and the second protrusion into the first groove, the second outer surface further comprises a first angled surface and the valve body comprises a second angled surface, the first and second angled surfaces being non-parallel and non-perpendicular relative to an axis extending through the valve seat, the first and second angled surfaces to matably engage when the valve seat is retained relative to the valve body.

21. A fluid regulator as defined in claim 20, wherein the first ring-shaped portion comprises a metallic ring and the second ring-shaped portion comprises an elastomeric ring.

22. A fluid regulator as defined in claim 20, wherein a surface of the first ring-shaped portion opposite the sealing surface frictionally engages the shoulder of the valve body to retain the valve seat in the valve body.

23. A fluid regulator as defined in claim 20, wherein the sealing surface is positioned between the first ring-shaped portion and the valve body of the fluid regulator prior to the sealing surface being engaged with the movable valve plug and during engagement of the movable valve plug with the sealing surface.

24. A fluid regulator as defined in claim 20, wherein the first outer surface comprises a third angled surface and the second inner surface comprises a fourth angled surface that is to matably engage to the third angled surface, the third and fourth angled surfaces being non-parallel and non-perpendicular relative to an axis extending through the valve seat.

* * * * *